United States Patent [19]

Ueda et al.

[11] Patent Number: 5,184,004
[45] Date of Patent: Feb. 2, 1993

[54] OPTICAL CODE READER

[75] Inventors: Shuji Ueda, Neyagawa; Shoro Mochida, Hirakata, both of Japan

[73] Assignee: Matsushita Electric Industrial Co., Ltd., Kadoma, Japan

[21] Appl. No.: 344,089

[22] Filed: Apr. 27, 1989

[30] Foreign Application Priority Data

Apr. 28, 1988 [JP] Japan ................. 63-106320

[51] Int. Cl.⁵ ............................................. G06K 7/10
[52] U.S. Cl. .................................. 235/462; 235/472
[58] Field of Search ............... 369/112, 45; 235/472, 235/462, 454, 470; 250/546, 568, 569; 350/446, 445, 503

[56] References Cited

U.S. PATENT DOCUMENTS

| | | | |
|---|---|---|---|
| 3,784,794 | 1/1974 | Allais | 235/472 |
| 3,809,863 | 5/1974 | Oberg | 235/472 |
| 3,868,514 | 2/1975 | Israelsson | 235/472 |
| 3,904,277 | 9/1975 | Phillips et al. | 235/472 |
| 3,911,270 | 10/1975 | Traub | 235/472 |
| 3,920,959 | 11/1975 | Wefers et al. | 235/472 |
| 4,143,809 | 3/1979 | Uebbing et al. | 235/472 |
| 4,345,321 | 8/1982 | Arquie et al. | 369/112 |
| 4,675,531 | 6/1987 | Clark et al. | 250/568 |
| 4,743,745 | 5/1988 | Kachi et al. | 235/454 |
| 4,797,551 | 1/1989 | Ferrante | 250/568 |
| 4,825,057 | 4/1989 | Swartz et al. | 235/472 |
| 4,851,667 | 7/1989 | Mergenthaler et al. | 250/568 |
| 4,877,949 | 10/1989 | Danielson et al. | 235/454 |

Primary Examiner—Robert Weinhardt
Attorney, Agent, or Firm—Cushman, Darby & Cushman

[57] ABSTRACT

Emitted light of a light emitting device (3) placed interiorly of a transparent cylindrical member (1) is reflected by a flat mirror (8) formed on an end of the transparent cylindrical member (1), then the reflected light is focused on a bar code (41) to be detected by an elliptical mirror (11) formed on the side (11A) of the cylindrical member (1), and reflected light from the bar code (41) is converged on a light receiving device (2) disposed interiorly of the cylindrical member (1) by a convex lens (9) which is formed on the other end of the transparent cylindrical member (1).

4 Claims, 6 Drawing Sheets

OPTICAL CODE READER

FIELD OF THE INVENTION AND RELATED ART STATEMENT

1. Field of the Invention

The present invention relates generally to an optical code reader, and more particularly to an optical code reader with improved optical system capable of detecting a coded mark such as bar code mark printed on a package of various goods with high reliability.

2. Description of the Related Art

A bar code system is widely introduced for identification of various goods by printing or attaching a bar code on goods or packages of the goods sold in department stores, super markets or factories. The bar code is read with an optical code reader to input the data of the bar code into a computer system. Moreover, recently in subscription system for recording a television program in a video tape recorder, channel number, date and time of a television program are presented by a bar code, which is read with a pen-type optical code reader to input the data of the bar code into the video tape recorder.

An example of a conventional optical code reader available for reading the bar code is shown in FIG. 8. The optical code reader is a hand-type and is relatively small in size. Referring to FIG. 6, a light emitting device 51 and a light receiving device 52 are arranged in parallel with each other in a holder 53. The emitted light of the light emitting device 51 is focused on a bar code 40 by a ball lens 54 which is positioned in immediate proximity to the bar code 40. The light reflected from the bar code 40 is converged by the ball lens 54 and is applied to the light receiving device 52.

In the foregoing conventional optical code reader as shown in FIG. 7, the ball lens 54 with a short focal distance is used, and a distance between the ball lens 54 and the bar code 40 is short. Therefore, an angle $\theta$ between the incident light 51A and the reflected light 52A is relatively large. Thus, the focal point of the incident light 51A is likely to deviate from the surface having the bar code even by a slight variation of a distance between the ball lens 54 and the bar code 40 or by tilt of the optical code reader with respect to the surface. This would cause an intensity of the light reflected from the bar code 40 to be adversely influenced. Furthermore, the surface of the bar code 40 is not always flat but has some concavities or convexities, and it is not so easy to scan the surface of the bar code with a perpendicular posture of the code reader to the surface of the bar code 40. These problems lead to error in reading of the bar code 40. In order to improve the difficulties, the distance between the ball lens 54 and the bar code 40 must be lengthened and the angle $\theta$ between the incident light 51A and the reflected light 52A must be reduced.

In the optical system as shown in FIG. 6, however, the distance between the ball lens 54 and the light emitting device 51 must be further prolonged in order to allow a longer distance between the ball lens 54 and the bar code 40. Consequently, an overall length of the optical code reader becomes larger.

OBJECT AND SUMMARY OF THE INVENTION

An object of the present invention is to provide a small-sized optical code reader which is improved in diminution of resolution due to variation of a distance between the optical code reader and the surface of an optical code.

The optical code reader in accordance with the present invention comprises:

an optical member having
- a flat mirror formed on one end of a transparent cylindrical member forming mirror face toward inside of said transparent cylindrical member,
- a first light converging means formed on a central portion of the other end of said transparent cylindrical member,
- a ring-shaped transparent portion formed on a peripheral portion of said first light converging means, and
- a second light converging means formed on side face of said transparent cylindrical member,
- a light emitting device for emitting light toward said flat mirror interiorly of said transparent cylindrical member, and
- a light receiving device placed interiorly of said transparent cylindrical member for receiving light reflected by a code irradiated by said light through said first light converging means.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the figures are schematic representations for purposes of illustration and do not necessarily depict the actual relative sizes or locations of the elements shown.

DESCRIPTION OF THE PREFERRED EMBODIMENTS

Figure 1:
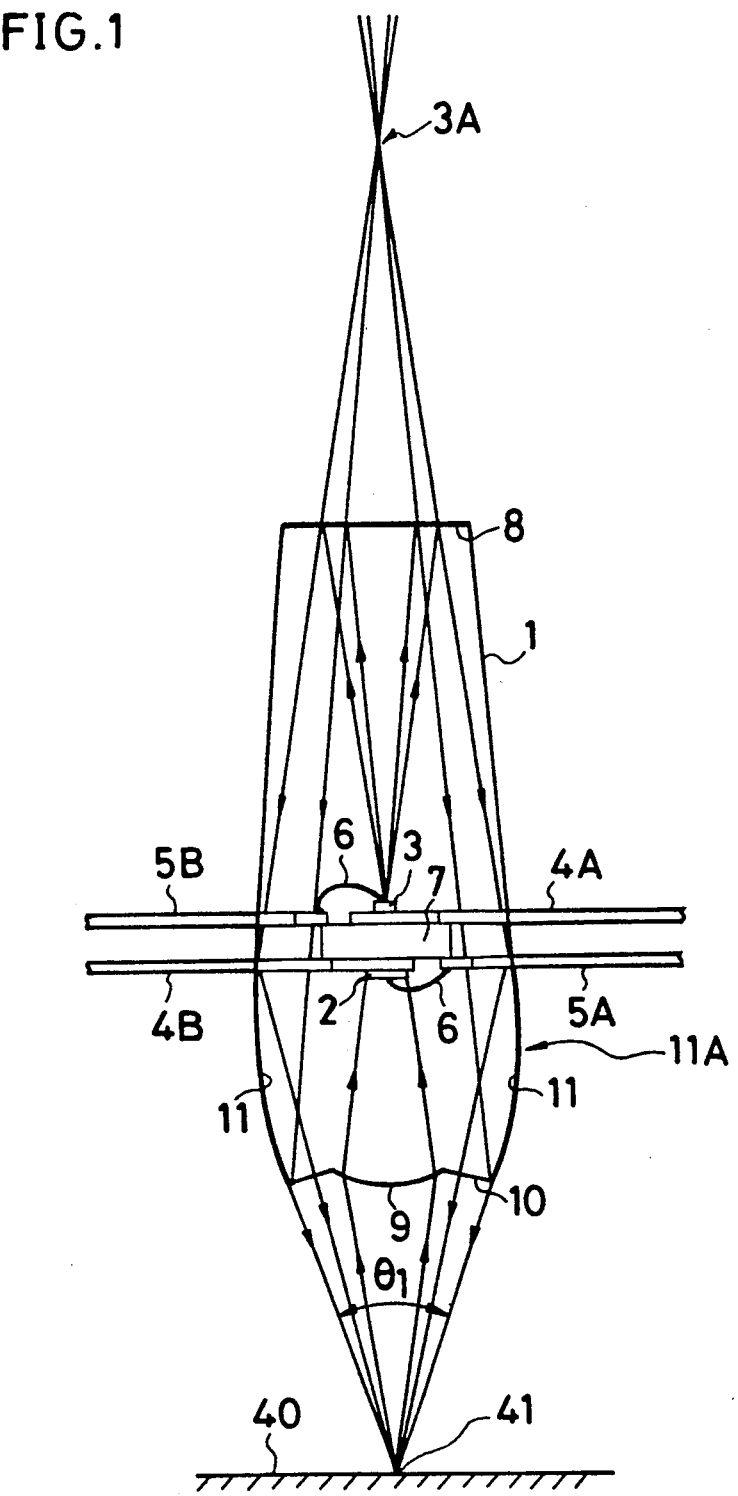
FIG. 1 is a side view of a first embodiment of an optical code reader in accordance with the present invention.

FIG. 1 is a side view of a first embodiment of an optical code reader in accordance with the present invention. Referring to FIG. 1, a flat mirror 8 is formed on the top surface of a cylindrical member 1, which is made of such as transparent plastic or glass, and the reflecting surface of the flat mirror 8 faces the interior of the cylindrical member 1. A convex lens 9 as first light converging means is disposed on a central portion of the other end of the cylindrical member 1. A ring-shaped transparent portion 10 is formed along the peripheral portion of the convex lens 9. Furthermore, a ring-shaped elliptical plane 11A is formed on the side of a lower portion of the cylindrical member 1. A specular layer is deposited on the ring-shaped elliptical plane 11A so that an elliptical mirror 11 in which the reflecting surface faces the interior of the cylindrical member 1 is formed. The elliptical mirror 11 can be realized by forming a specular surface on the elliptical plane 11A.

A light emitting device 3 mounted on one side of a lead frame 4A and facing the flat mirror 8 is placed interior of a mid portion of the cylindrical member 1. The other surface of the lead frame 4A is attached with the other lead frame 4B with a light interrupting plate 7 therebetween, and a light receiving device 2 is mounted on the other surface of the lead frame 4B so as to face the convex lens 9. The light interrupting plate 7 serves as a light interrupting member between the light emitting device 3 and the light receiving device 2.

Figure 5:
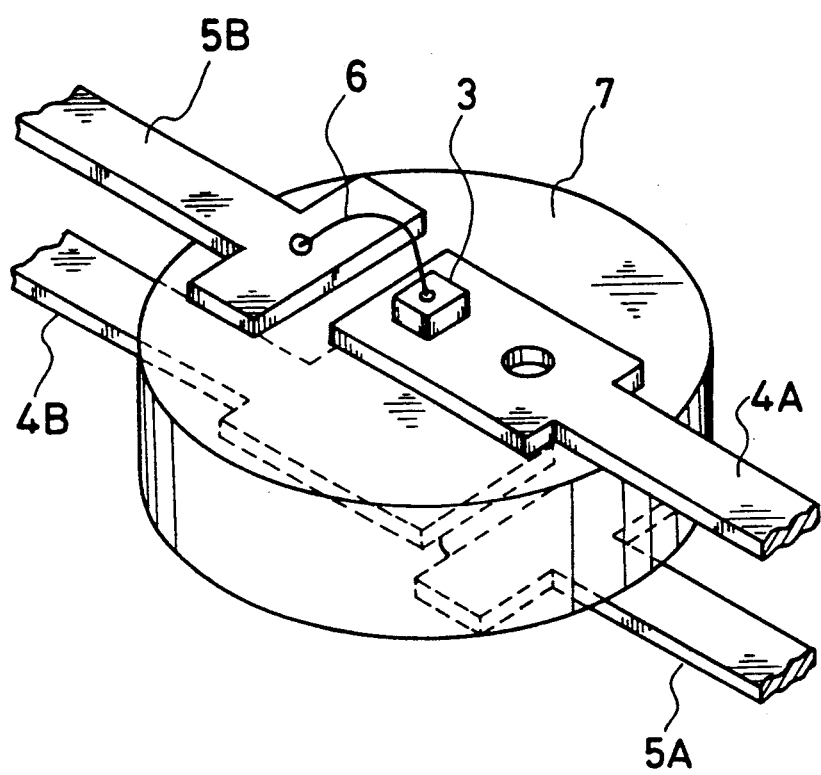
FIG. 5 is a perspective view of lead frames of the first embodiment and the third embodiment.
Figure 6:
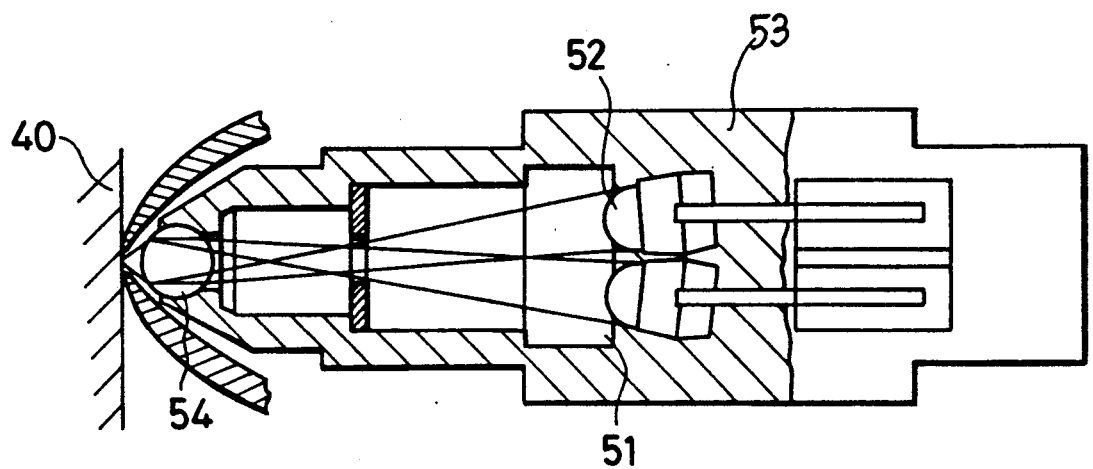
FIG. 6 is the side view of the optical code reader in the prior art.
Figure 7:
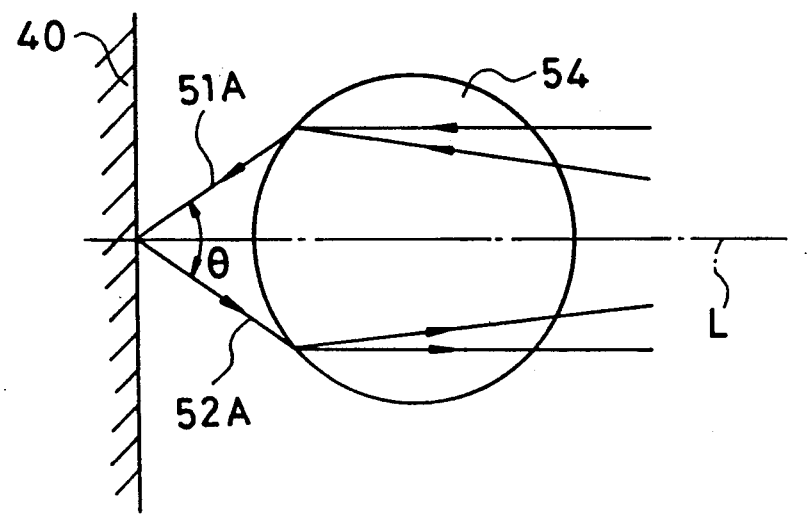
FIG. 7 is the detailed side view of the lens of the prior art as shown in FIG. 6.

A lead frame 5B positioned adjacent to the light emitting device 3 serves as a lead wire of the light emitting device 3. Another lead frame 5A positioned adjacent to the light receiving device 2 serves as a lead wire of the light receiving device 2. The shape and placement of the respective lead frames 4A, 4B, 5A and 5B are shown in FIG. 5. An electric power for driving the light emitting device 3 is supplied through the lead frames 4A and 5B via wires 6, and an output of the light receiving device 2 is issued through the lead frame 4B and 5A via wires 6.

One focal point of the elliptical mirror 11 is positioned at a symmetrical point 3A of the light emitting device 3 with respect to the flat mirror 8, and the other focal point is positioned at a point 41 which is on a bar code 40.

Emitted light of the light emitting device 3 is reflected by the flat mirror 8 and directed to the elliptical mirror 11. The light relfected by the elliptical mirror 11 converged on the focal point 41 on the bar code 40 through the transparent portion 10. Light reflected by the bar code 40 is converged on the light receiving device 2 by the convex lens 9.

In the embodiment, since the light emitted from the light emitting device 3 is folded by the flat mirror 8, the effective distance between the light emitting device 3 and the focal point 41 is far longer than the length of the cylindrical member 1, and is also larger than a distance between the convex lens 9 and the bar code 40. Consequently, an incident angle $\theta_1$ of the incident light is small, and a permissible deviation of a distance between the end tip of the optical code reader and the bar code 40 with respect to a predetermined diameter of a "permissible circle of confusion" of the incident light at the point 40 increases. Hence, deterioration of a resolving power of the optical code reader due to the deviation of the distance between the optical code reader and the bar code 40 can be improved.

Figure 2:
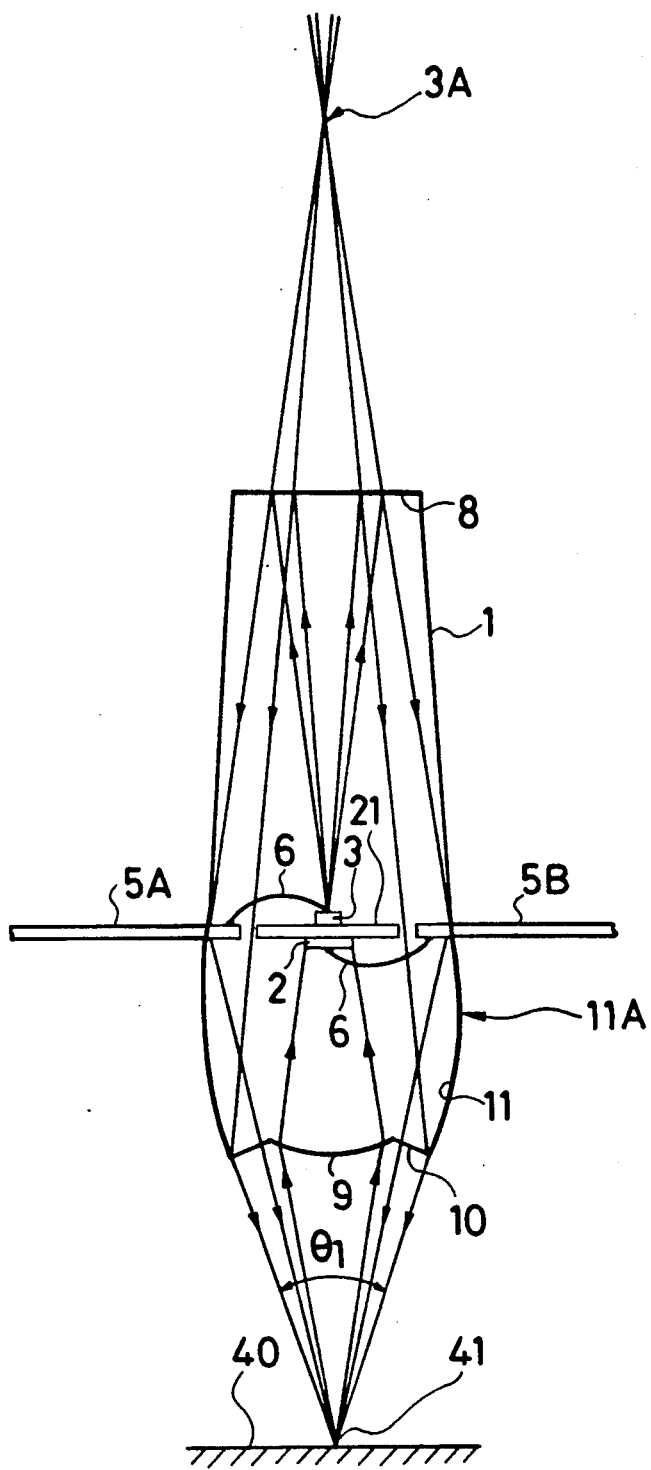
FIG. 2 is a side view of a second embodiment of an optical code reader in accordance with the present invention.
Figure 3:
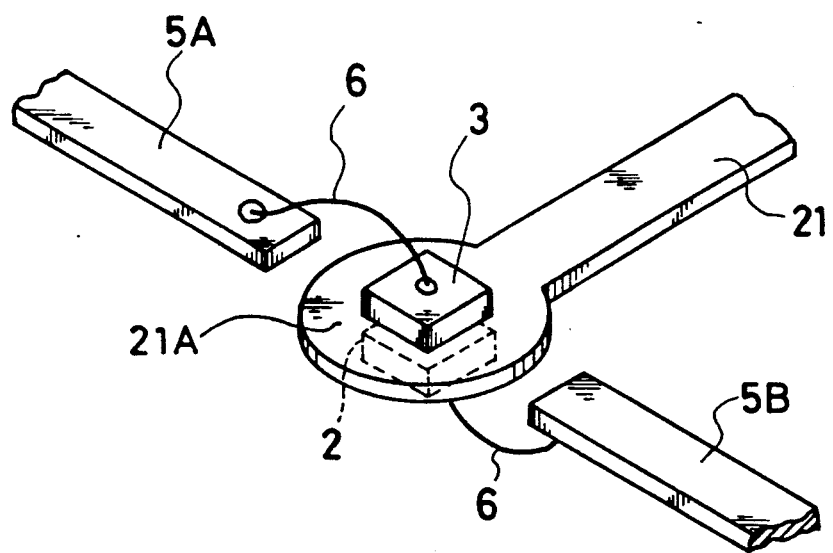
FIG. 3 is a perspective view of lead frames of the second embodiment.

FIG. 2 shows a second embodiment of the optical code reader in accordance with the present invention. In the second embodiment, the optical system is identical with that of the first embodiment. However, a configuration of lead frames supporting the light emitting device 3 and the light receiving device 2 are different from that of the first embodiment. Referring to FIG. 2, the light emitting device 3 is mounted on one side of a common lead frame 21, and the light receiving device 2 is mounted on the other surface of the lead frame 21. FIG. 3 is a perspective view of the common lead frames 21, and connection leads 5A and 5B. The lead frame 21 has a circular portion 21A on which the light emitting device 3 and the light receiving device 2 are mounted, and the circular portion 21A serves as a light interrupting plate between the light emitting device 3 and the light receiving device 2. A lead frame 5A serves as a lead wire of the light emitting device 3 and a lead frame 5B serves as a lead wire of the light receiving device 2.

According to the second embodiment, the number of lead frames decreases by using the common lead frame 21, and the light interrupting plate used in the first embodiment can be eliminated. Consequently, manufacturing cost of the optical code reader is reduced.

Figure 4:
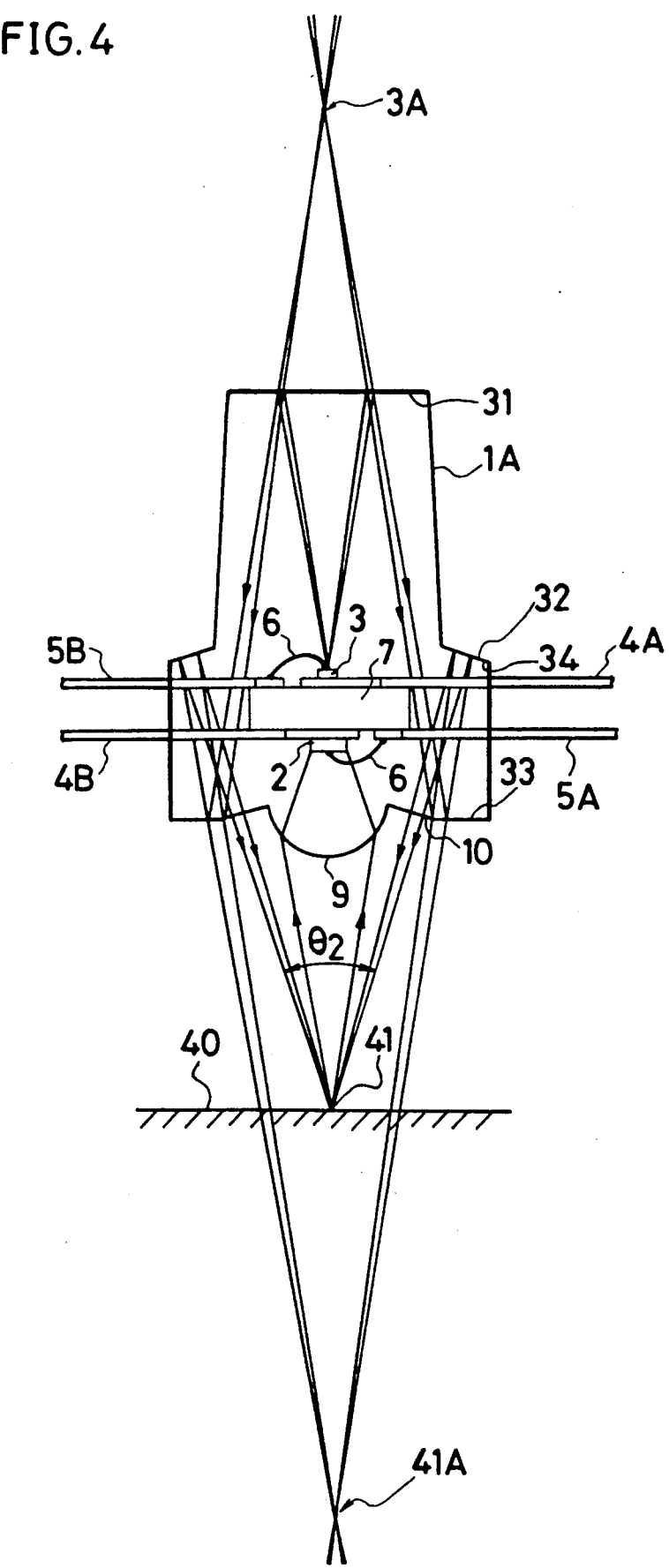
FIG. 4 is a side view of a third embodiment of an optical code reader in accordance with the present invention.

FIG. 4 is a side view of a third embodiment of the optical code reader in accordance with the present invention. Referring to FIG. 4, a first flat mirror 31 having a reflecting surface facing interior of the cylindrical member 1A, is formed on the upper end surface of a transparent cylindrical member 1A. A flange 32 which is larger in diameter than the portion having the first flat mirror 31 is disposed on a mid portion of the cylindrical member 1A. The flange 32 is shaped to form an elliptical plane, and an elliptical mirror 34 having a reflecting surface facing interior of the cylindrical member 1A is formed thereon. A ring-shaped second flat mirror 33 which is parallel with the first flat mirror 31 is disposed under surface of the flange 32. A convex lens 9 is disposed on a central portion of the bottom of the cylindrical member 1A, and a ring-shaped transparent portion 10 is placed between the convex lens 9 and the ring-shaped second flat mirror 33. One of two focal points of the elliptical mirror 34 is positioned at a point 41A which is a symmetrical point of a point 3A with respect to the ring-shaped second flat mirror 33, and the other focal point is positioned on a point 41 on the bar code 40. The arrangement of the lead frames 4A, 4B, 5A and 5B, the light emitting device 3 and the light receiving device 2 is identical with that of the first embodiment as shown in FIG. 1.

According to the third embodiment, a substantial distance between the light emitting device 3 and the point 41 on the bar code 40 is longer than that of the first embodiment. Consequently, an angle $\theta_2$ of the incident light is smaller than the angle $\theta_1$ in the first embodiment.

In the third embodiment, even in case that the respective positions of the ring-shaped second flat mirror 33 and the elliptical mirror 34 are reversed, the same result is obtainable. Though the transparent cylindrical member 1 in the above-mentioned embodiments is tapered on an upper portion thereof above the elliptical mirror, the upper portion may be straight cylinder.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. An optical code reader comprising:
an optical member having
a transparent cylindrical member,
a flat mirror formed on one end face of said transparent cylindrical member, having a reflection surface which faces toward an inside of said transparent cylindrical member,
a convex lens for converging light reflected from a code to be read, formed on a central portion of the other end face of said transparent cylindrical member which in operation is adapted to face said code to be read, a ring-shaped transparent portion located surrounding said convex lens at an outer peripheral portion of said convex lens, a light interrupting plate attached to said cylindrical member, a light emitting device for emitting light toward said flat mirror and away from said code, mounted interior to said transparent cylindrical member on a first surface of said plate, an elliptical mirror formed on a side face of said transparent cylindrical member having a reflection surface facing an inside of said member and located to have a focal point where said code is adapted to be located, said elliptical mirror receiving light from said light emitting device, reflected by said flat mirror, and converging said light to said focal point through said transparent portion, and a light receiving device placed behind said light emitting device, on the other surface of said plate, said light receiving device mounted on the interior of said transparent cylindrical member and facing said other end face, for receiving light reflected by said code through said convex lens.

2. An optical code reader comprising:

an optical member having a transparent cylindrical member, which is enlarged in diameter on one part thereof as compared with its diameter at least at one of its ends, a flat mirror formed on one end face of said transparent cylindrical member, having a reflection surface facing toward an inside of said transparent cylindrical member, a convex lens formed on a central portion of the other end face of said transparent cylindrical member, which in operation is adapted to face a code to be read, a ring-shaped transparent portion located surrounding said convex lens on an outer peripheral portion of said convex lens, a ring-shaped flat mirror located outward from and peripheral to said ring-shaped transparent portion, having a reflection surface which faces toward the inside of said transparent cylindrical member, a ring-shaped elliptical mirror having at least a partial elliptical face including a ring-shaped relfecting surface facing interiorly of said transparent cylindrical member, formed on said enlarged in diameter part, a plate, coupled to said transparent cylindrical member, a light emitting device for emitting light toward said flat mirror and away from the code, placed interior to said transparent cylindrical member on a surface of said plate, said flat mirror reflecting said light from said light emitting device to said elliptical mirror which converges light toward said ring-shaped flat mirror, which reflects light to said code through said ring-shaped transparent portion, and a light receiving device placed behind said light emitting device on the other surface of said plate on the interior of said transparent cylindrical member and facing said other end face, for receiving light reflected by the code through said convex lens.

3. An optical code reader in accordance with claim 2, wherein said plate is a light interrupting member placed between said light emitting device and said light receiving device which blocks at least part of the light transmitted by said light emitting device.

4. An optical code reader in accordance with claim 2, wherein said light emitting device is mounted on a surface of a plate-type lead frame and said light receiving device is mounted on the bace surface of said lead frame.

* * * * *